United States Patent [19]

Bowe et al.

[11] 4,243,314
[45] Jan. 6, 1981

[54] ADJUSTABLE WIDTH PUNCH MARKING APPARATUS FOR PHOTOGRAPHIC PRINTER

[75] Inventors: Gerald R. Bowe, Blaine; James F. Stewart, St. Paul, both of Minn.

[73] Assignee: Pako Corporation, Minneapolis, Minn.

[21] Appl. No.: 64,131

[22] Filed: Aug. 6, 1979

[51] Int. Cl.³ ............................................. G03B 29/00
[52] U.S. Cl. .................................... 355/29; 83/560; 346/78
[58] Field of Search ................ 355/28, 29, 13, 40–43, 355/54; 346/78; 83/560

[56] References Cited

U.S. PATENT DOCUMENTS

| | | | |
|---|---|---|---|
| 2,781,096 | 2/1957 | Garity | 83/560 X |
| 3,171,316 | 3/1965 | Kuever | 83/560 X |
| 3,209,644 | 10/1965 | Simmon et al. | 355/54 |
| 3,807,855 | 4/1974 | Zajac | 355/29 |
| 3,844,253 | 10/1974 | Staub et al. | 355/29 X |
| 3,898,002 | 8/1975 | Kinder et al. | 355/40 |
| 3,900,257 | 8/1975 | Woolley, Jr. et al. | 355/29 |
| 3,947,109 | 3/1976 | Kinder et al. | 355/29 |
| 3,982,457 | 9/1976 | Berry | 83/560 X |
| 4,073,588 | 2/1978 | Zangenfeind et al. | 355/41 |
| 4,140,390 | 2/1979 | Schultheis et al. | 355/29 |
| 4,157,221 | 6/1979 | Rauen | 355/29 |

FOREIGN PATENT DOCUMENTS 587438  1/1978  U.S.S.R. ................................. 355/29

*Primary Examiner*—Richard A. Wintercorn
*Attorney, Agent, or Firm*—Kinney, Lange, Braddock, Westman and Fairbairn

[57] ABSTRACT

A photographic printer has a punch marking system for placing cut and end-of-order marks on the photographic paper. The punch marking mechanism is adjustable to accommodate different widths of print paper. The punch marking mechanism includes guide rods which are positioned transverse to the path of the print paper. First and second carriage assemblies are movable along the guide path defined by the guide rods on opposite sides of the center line of the paper path. A lead screw moves both the first and second carriage assemblies along the guide path in an essentially symmetrical manner about the center line of the paper path. The punches or other marking devices are carried on the first and second carriage assemblies.

9 Claims, 11 Drawing Figures

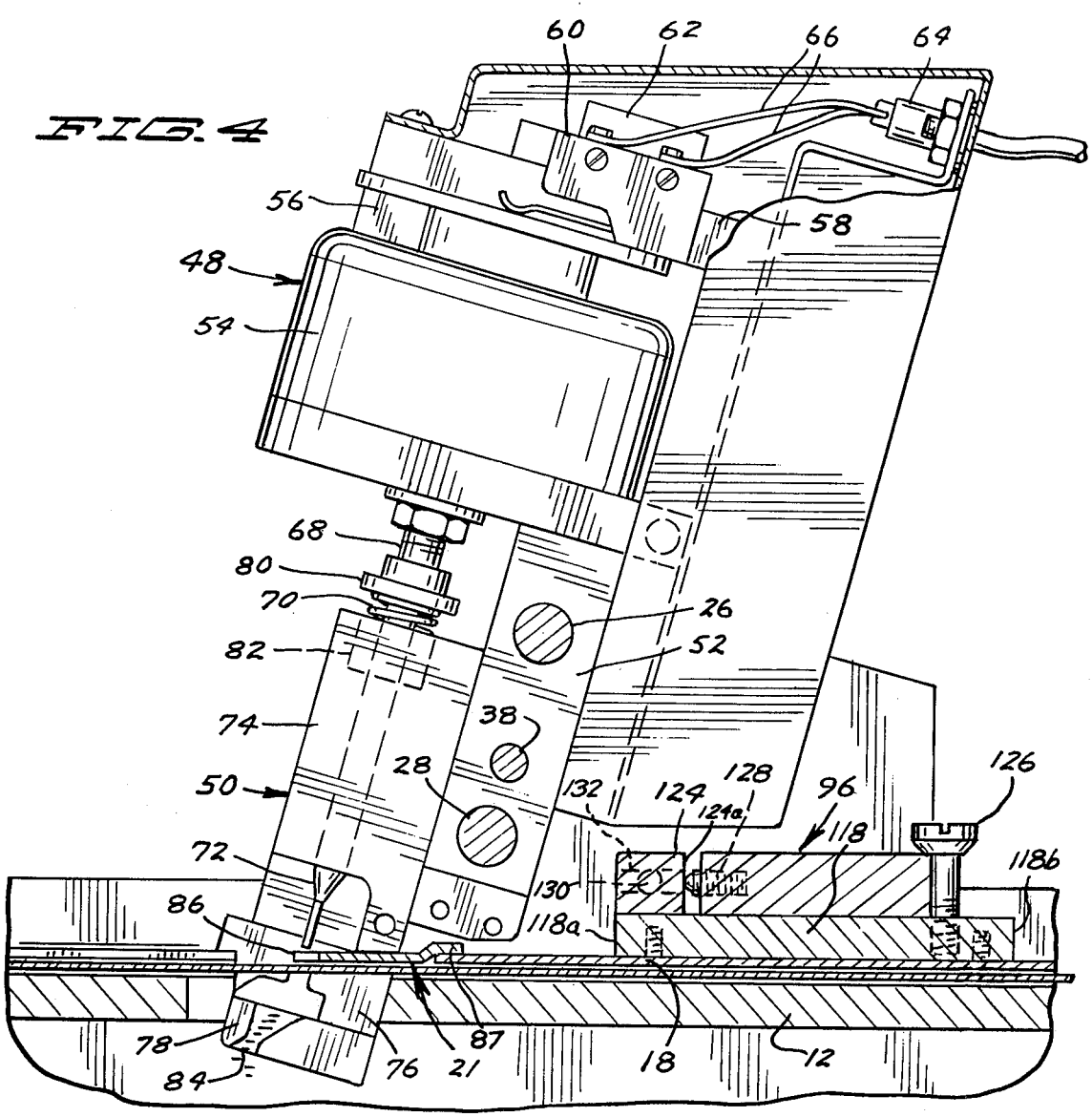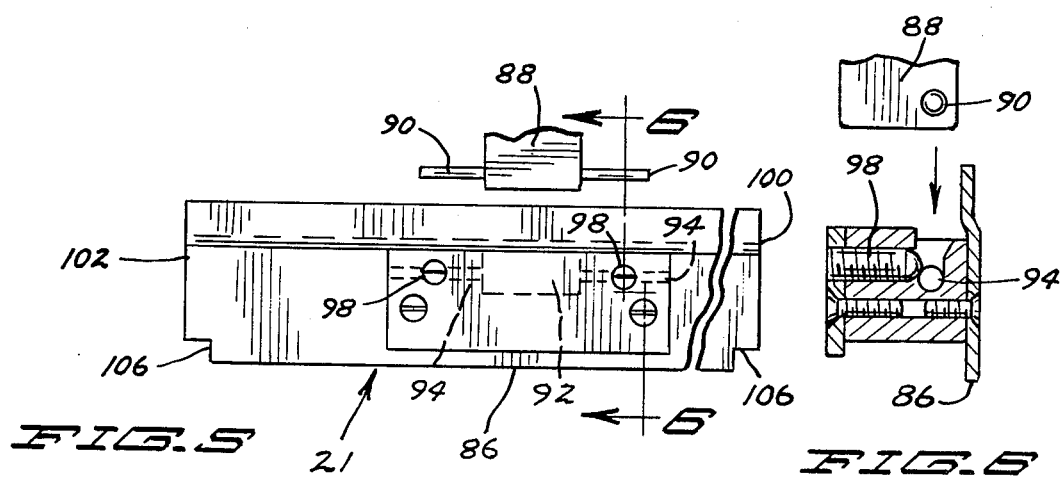

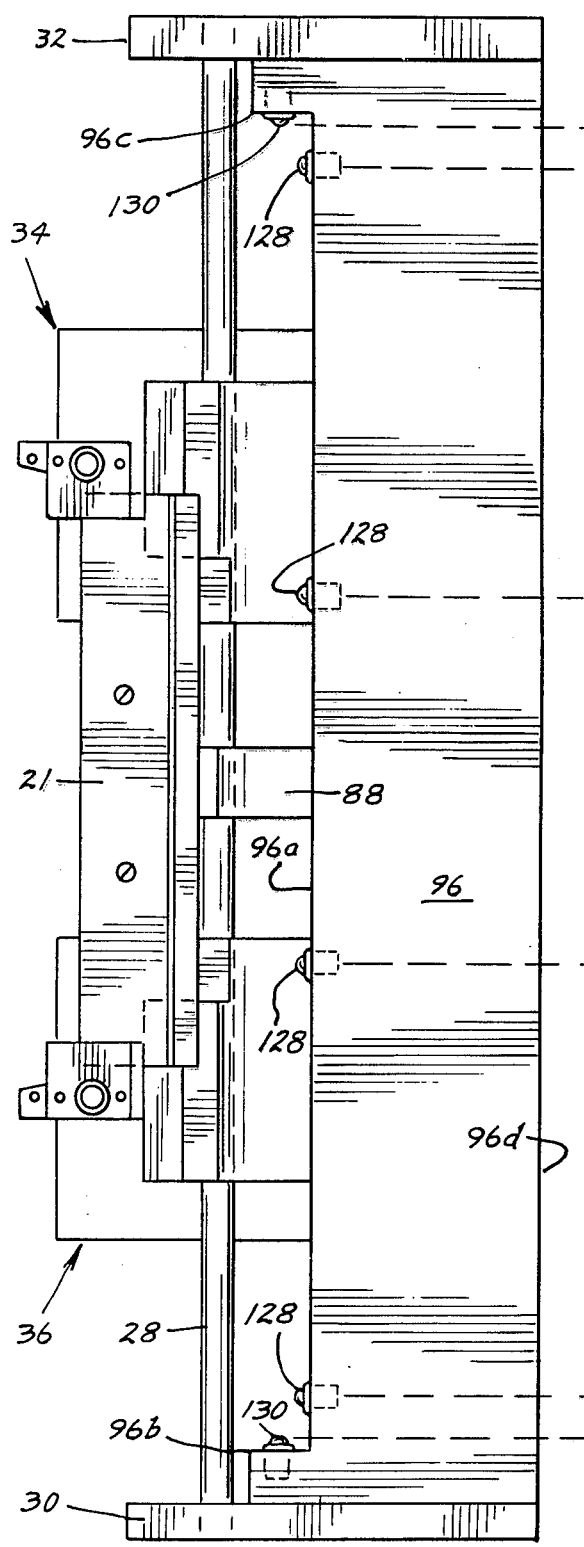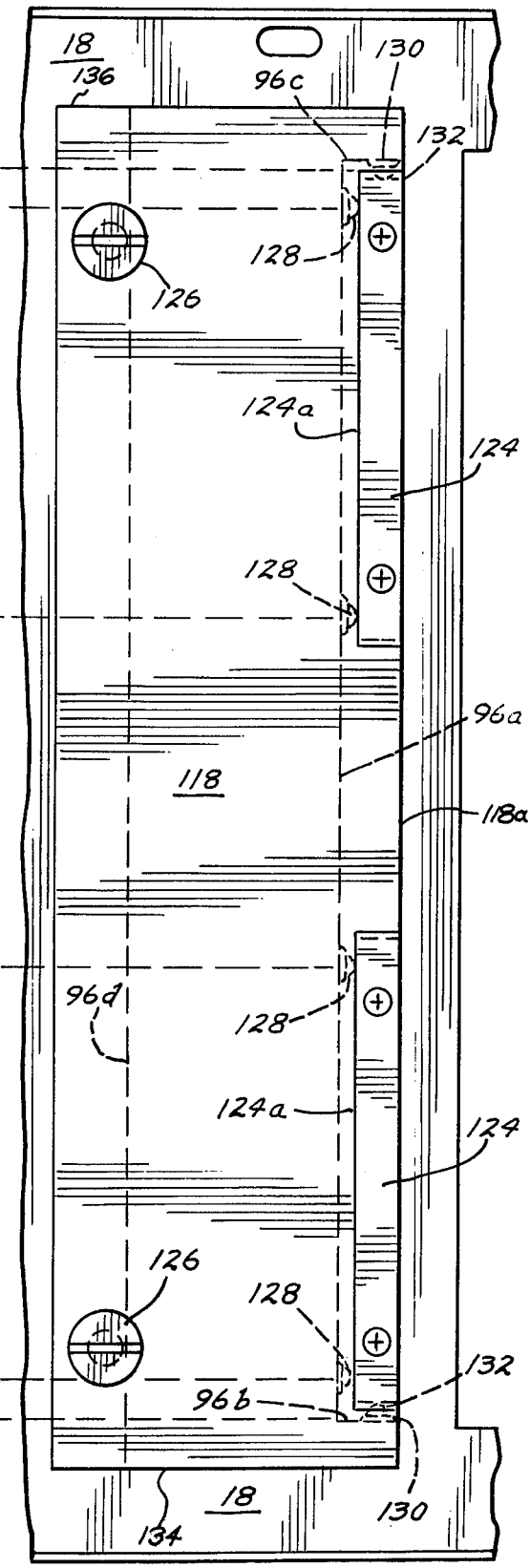

ADJUSTABLE WIDTH PUNCH MARKING APPARATUS FOR PHOTOGRAPHIC PRINTER

REFERENCE TO CO-PENDING APPLICATION

Reference is made to co-pending applications by R. Anderson and J. Wedel entitled "Adjustable Width Punch Marking Apparatus with Interchangeable Spacer Inserts" Ser No. 063,675 and by R. Anderson and J. Wedel entitled "Modular Punch Marking Apparatus", Ser. No. 063,674 which were filed on even date with this application and are assigned to the same assignee as this application.

BACKGROUND OF THE INVENTION

1. Field of the Invention

The present invention relates to photographic processing equipment. In particular, the present invention is an adjustable width marking system for providing cut and end-of-order marks on photographic print paper strips.

2. Description of the Prior Art

In commercial photographic processing operations very high rates of processing need to be achieved and maintained in order to operate profitably. To expedite the photographic processing, films of similar type and size are spliced together for developing and printing purposes. After the films are developed, a photographic printer prints the photographic images contained in the film in an edge-to-edge relationship on a continuous strip of photosensitive paper. The photographic printer causes high intensity light to be passed through the film and imaged on the photographic print paper, thereby exposing the photographic emulsion layers of the print paper. The print paper is subsequently removed from the printer and developed. A photographic paper cutter cuts individual prints from the strip, the prints are sorted by customer order (either manually or automatically), and are ultimately packaged and sent to the customer.

Automatic photographic paper cutters have been developed which automatically cut the print paper into individual prints. These automatic paper cutters are controlled by indicia which are placed along the print paper by the photographic printer. Typically the indicia are of two types: cut marks and end-of-order marks. Cut marks indicate the desired location of a cut between adjacent prints. End-of-order marks, which typically appear along the opposite edge of the print paper from the cut marks, indicate the end of a customer's order. The automatic paper cutter includes a sensor which senses the cut marks and causes the individual prints to be cut from the strip at desired locations. The separated prints are passed to an order packaging or grouping device which groups the prints in response to the end-of-order marks which are sensed by the automatic cutter.

In many photographic printers the cut marks and end-of-order marks are produced by solenoid driven paper punches, which punch a small hole or notch at or near the edge of the print paper. Another type of device for producing cut marks and end-of-order marks uses small light sources positioned in the opposite edges of the print paper. The cut marks and end-of-order marks are produced by energizing the appropriate light source. This causes a small portion of the print paper to be exposed. The intensity and duration of the light from the light source creates a small dark photographically produced mark near the edge of the print paper.

It is important that the cut marks and end-of-order marks be placed in a predictable position with respect to the edges of the photographic print paper, so that the marks can be sensed reliably. In large photofinishing operations a photographic printer may be "dedicated" to a single size of print, and the position of the marking devices is originally set and is adjusted infrequently. In smaller photofinishing operations the same printer often is used to make prints of different sizes, which generally entails a change in the width of the print paper. In photographic printers which handle more than one width of print paper, the adjustments of the cut and end-of-order making devices can prove to be quite time-consuming. Whenever the width of print paper is changed, the marking devices must be readjusted so that they have the proper position with respect to the edges of the print paper. There is a need for improved cut and end-of-order marking devices which can be used with a variety of paper widths, while not requiring time-consuming adjustments.

SUMMARY OF THE INVENTION

The present invention is an adjustable indicia producing apparatus for providing cut and end-of-order indicia on photographic print paper strips. The apparatus is adjustable to accommodate print paper strips of different widths.

The apparatus of the present invention includes guide means which define a guide path which is transverse to the path of the print paper strip. First and second carriage assemblies are movable along the guide path on opposite sides of the center line of the paper path. The first and second carriage assemblies are positioned by carriage positioning means. The movement of the first and second carriage assemblies along the guide path is essentially symmetrical about the center line of the paper path.

Carried on the first carriage assembly is first indicia producing means, which provides indicia at selected positions of the print paper. In preferred embodiments, second indicia producing means carried by the second carriage assembly also provides indicia at selected positions of the print paper.

BRIEF DESCRIPTION OF THE DRAWINGS

FIG. 4 is a side view of the punch assembly carriage taken along the line 4—4 in FIG. 3.

FIG. 5 is a top view of a spacer insert.

FIG. 6 is a cross-sectional view taken along the line 6—6 in FIG. 5.

FIG. 7 is an inclined front view of the apparatus without the spacer insert in place.

FIG. 10 is a bottom view of the punch marking module.

FIG. 11 is a top view of a portion of the paper mask showing the mounting assembly for mounting the punch marking module.

DETAILED DESCRIPTION OF THE PREFERRED EMBODIMENT

Figure 1:
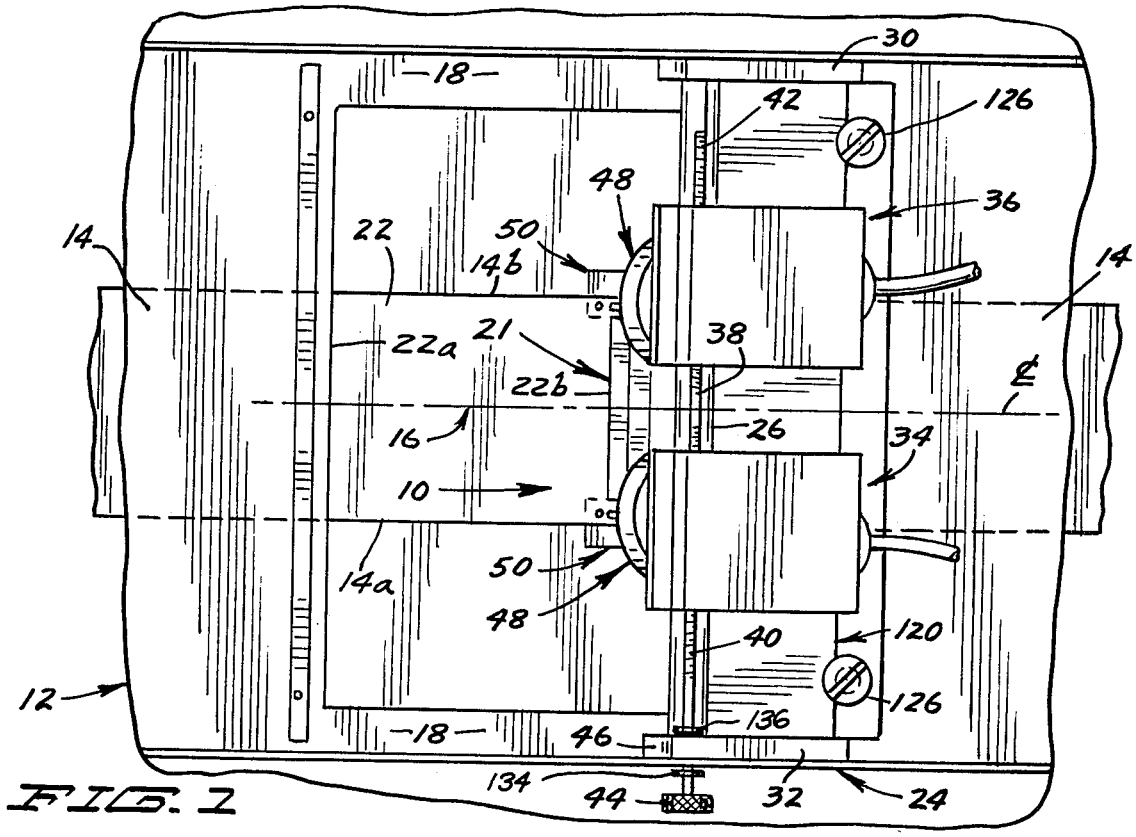
FIG. 1 is a top view of the apparatus of the present invention on a photographic printer.
Figure 2:
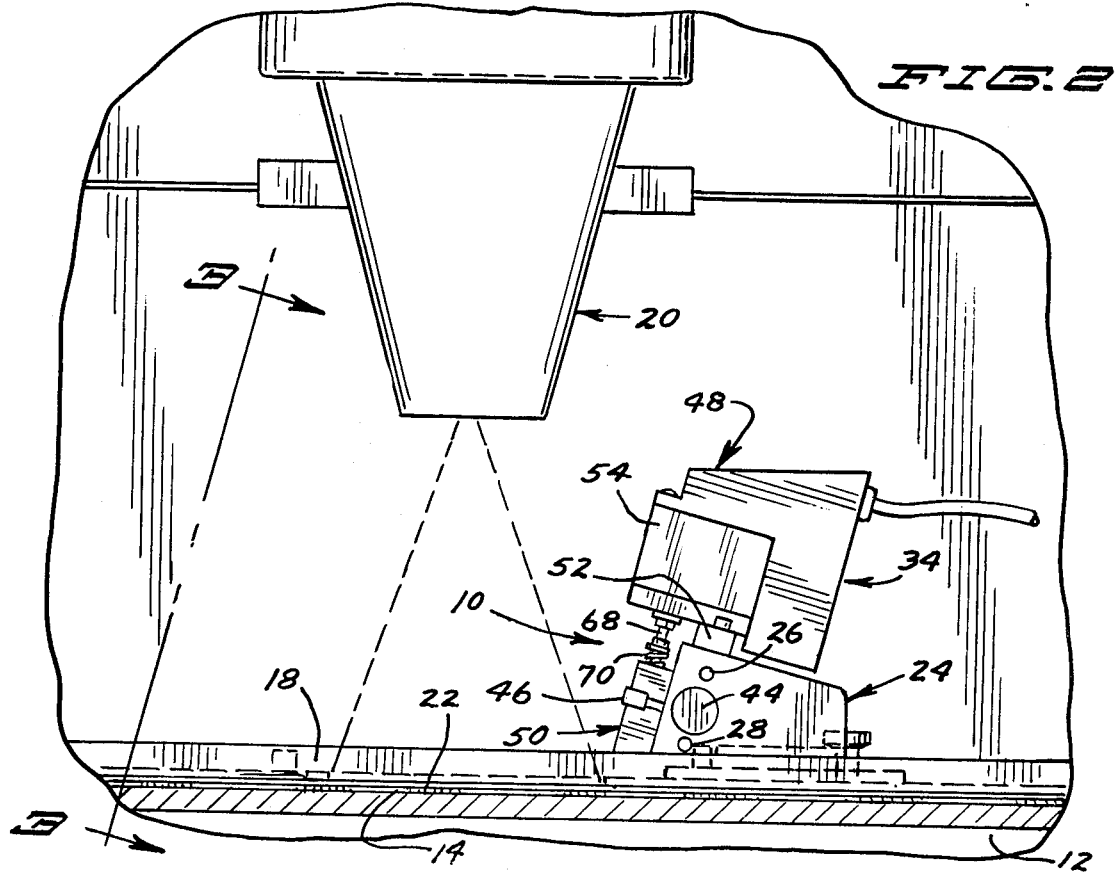
FIG. 2 is a side view of the apparatus of FIG. 1 including a portion of the optics of the photographic printer.
Figure 2:
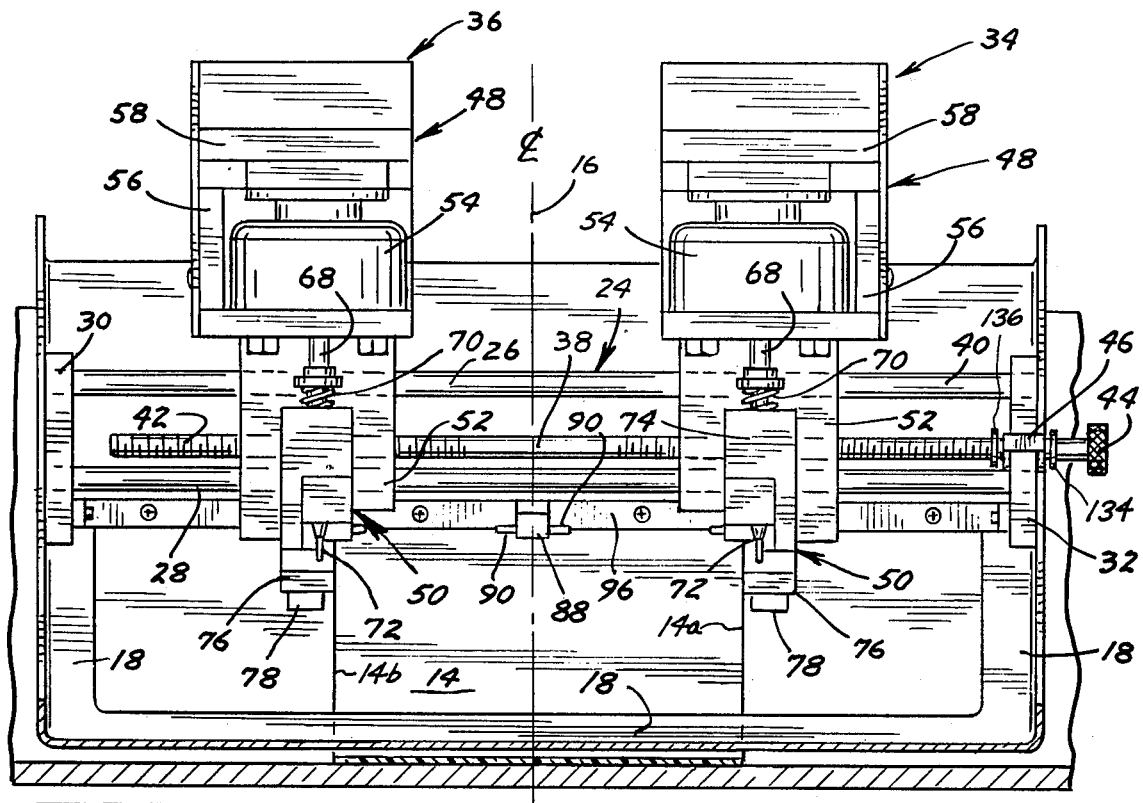

FIGS. 1 and 2 show an adjustable indicia producing apparatus of the present invention generally indicated at 10 on a photographic printer 12. The photographic printer 12 has photographic print paper 14 being transported along a path defined by a center line 16. A paper mask 18 and a punch spacer insert 21 define two transverse borders 22a and 22b of exposed area 22 of the photographic print paper 14. The other two borders of the exposed area are defined by side edges 14a and 14b of the print paper 14, since the embodiment shown is producing borderless prints. FIG. 2 shows a portion of the optics 20 of the photographic printer 12 that is used to expose area 22.

Figure 3:
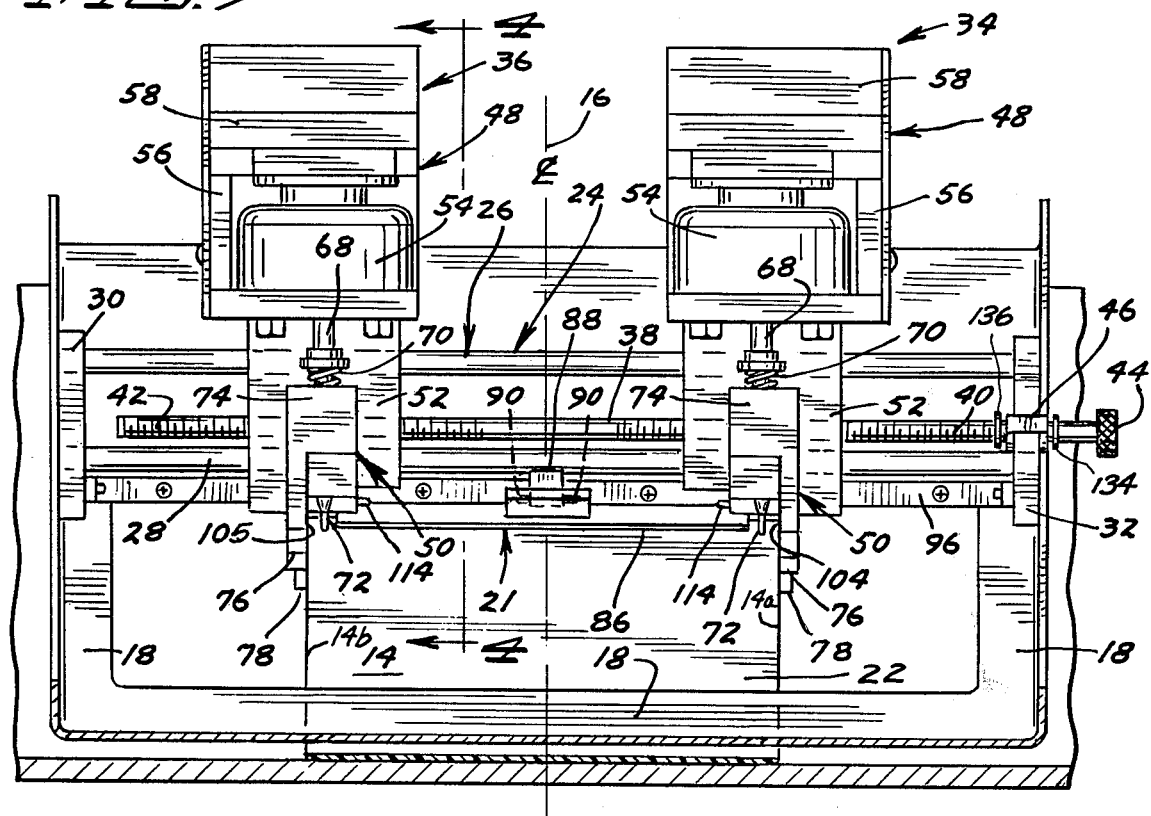
FIG. 3 is an inclined front view of the apparatus.

A guide means, generally indicated at 24 in FIGS. 1-3, defines a guide path transverse to the center line 16 of the print paper 14. The guide means 24 includes a plurality of guide rods also positioned transverse to the center line 16 of the print paper 14. In the preferred embodiment the guide means 24 includes top guide rod 26 and bottom guide rod 28. The top guide rod 26 and the bottom guide rod 28 are fixedly attached to left holder 30 at one end and to right holder end 32 at the other end. The guide rods 26 and 28 are preferably made of a smooth metal.

A first carriage assembly 34 and a second carriage assembly 36 are slidably supported by and move along the path defined by the top guide rod 26 and the bottom guide rod 28. First carriage assembly 34 and second carriage assembly 36 are movable only on their respective sides of center line 16. Thus, the first carriage assembly 34 is movable only on the right side of the center line 16 and the second carriage assembly 36 is movable only on the left side of the center line 16.

A carriage positioning lead screw 38 is positioned essentially parallel to the top guide rod 26 and bottom guide rod 28. The lead screw 38 has a first threaded portion 40 and a second oppositely threaded portion 42 for moving the first carriage assembly 34 and the second carriage assembly 36 along the guide path defined by the guide rods 26 and 28. The carriage assemblies 34 and 36 are positioned initially so as to move symmetrically in opposing directions about the center line 16 propelled by the threaded portions 40 and 42.

The lead screw 38 is rotatably attached preferably to right holder end 32 and has an adjustment screw knob 44 fixedly attached to one end for rotating the lead screw 38. The lead screw 38 is held in the position adjusted to by lead screw lock 46.

The carriage assemblies 34 and 36 include solenoid assembly 48, indicia producing assembly 50 and traversing block 52 as shown in FIGS. 3 and 4. The carriage assemblies 34 and 36 are mirror images of each other, and the same reference numerals are used to indicate similar components of assemblies 34 and 36.

The solenoid assembly 48 includes a solenoid 54, a solenoid support spacer 56, and a solenoid top plate assembly 58. The solenoid top plate assembly 58 is best seen in FIG. 4 and includes Microswitch 60 mounted on bracket 62 and conductively connected to electrical connector 64 by electrical conductor 66. Microswitch 60 provides a signal which indicates when solenoid 54 has driven punch 72 downward into engagement with paper 14 and further provides a signal when punch 72 has retracted. These signals provide a failsafe check on the operation of punch 72 to ensure that punch 72 is not stuck.

The indicia producing assembly 50 is preferably a hole punch producing assembly which is actuated by solenoid rod 68. The assembly includes a spring bias 70, punch 72, punch guiding block 74, punch die 76 and chad deflector 78. The spring bias 70 is held in place by a retaining washer 80 and a recess 82 within punch guiding block 74. The spring bias 70 is preferably a coil spring coiled around the punch 72 biasing the punch 72 in a retracted position. Punch 72 engages punch die 76 to produce a punched hole in the print paper 14. The chad 84 produced by the punch 72 is deflected by chad deflector 78.

The solenoid assembly 54 and the indicia producing assembly 50 are fixedly attached to traversing block 52. The traversing block 52 slidably engages top guide rod 26 and bottom guide rod 28 and is propelled by carriage positioning lead screw 38.

The punch spacer insert 21, which is the subject of the previously mentioned co-pending application entitled "Adjustable Width Punch Marking Apparatus With Interchangeable Spacer Inserts", defines the spacing between the first carriage assembly 34 and the second carriage assembly 36 by being positioned between the two carriage assemblies. The punch spacer insert also defines one transverse border 22b of the exposed area 22 by an edge 86. Insert 21 also overlaps mask 18 at insert edge 87 (as best shown in FIG. 4) and acts as the light seal for shielding the remainder of the print paper to prevent double exposure.

Punch spacer insert 21 is held in place by a punch spacer key 88 engaging a punch spacer key recess 92 of the punch spacer 21 and a punch spacer shaft 90 (which is connected to punch spacer key 88) engaging a punch spacer shaft recess 94 of punch spacer 21. The mid point of the punch spacer key 88 is positioned on center line 16 as shown in FIG. 3 and is fixedly attached to rigid member 96, which in turn is fixedly attached to right holder end 32 and left holder end 30. The mid point of the recess 92 is the mid point of the punch spacer insert 21, and when recess 92 engages punch spacer key 88, exactly one-half of the punch spacer insert 21 is to the right of the center line 16 and the other half of the punch spacer insert 21 is to the left of the center line 16. The punch spacer insert 21 is held in place by a ball plunger 98 which engages punch spacer shaft 90, as best seen in FIG. 6. The ball plunger 98 allows the shaft 90 to be snapped into recess 94 and held in place and to be easily removed when a different punch spacer insert 21 is desired.

The punch spacer insert 21 also engages the punch guiding block 74 of first carriage assembly 34 with right spacer insert end 100 at point 104 and engages the punching guide block 74 of the second carriage assembly 36 with left spacer insert end 102 at point 105. The punch spacer insert 21 has a slot 106 at both right end 100 and left end 102, as shown in FIG. 5. Slot 106 provides clearance for punch 72 to pass through in punching print paper 14. In general, slot 106 is made as small as practical while still providing the necessary clearance, since the area of print paper 14 under slot 106 will be double-exposed, and the extent of this double-exposed area should be as small as possible.

FIG. 7 shows the present invention without the spacer insert 21 in place and with carriage assemblies 34 and 36 spaced slightly further apart than their final spacing after insert 21 is inserted. In FIG. 7 paper 14 has been threaded and both edges 14a and 14b of print paper 14 ride atop the punch die 76 of the indicia producing assembly 50. The punch spacer insert 21 is then inserted on top of the print paper 14 and the first and second assemblies 34 and 36 are moved toward the spacer insert 21 by turning screw knob 44 until the assemblies engage the insert. The paper travels between the punch die and the punch spacer insert. An alternative method is to insert the punch spacer insert and engage it with the carriage assemblies prior to threading the print paper 14 between the punch die and the punch spacer insert. However, this method is more difficult to do in the dark.

Figure 8:
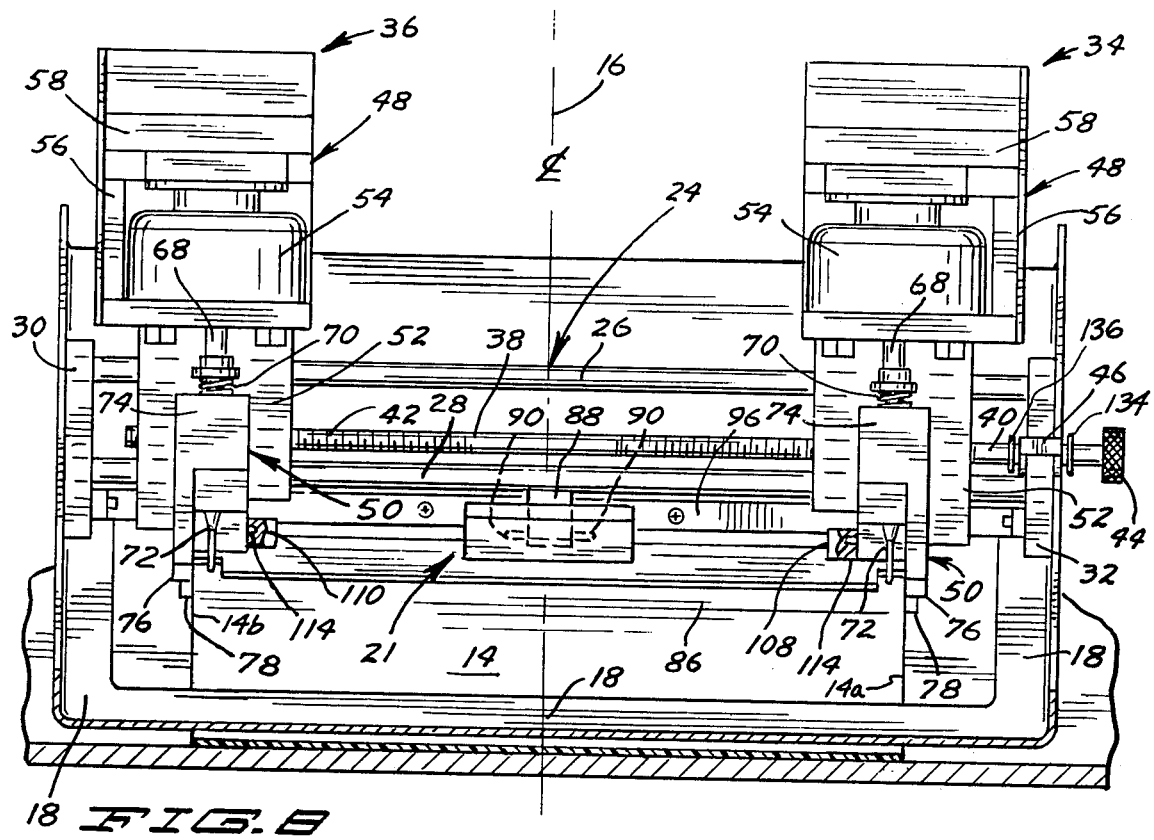
FIG. 8 is an inclined front view of the apparatus with a wide spacer insert.

For wider paper widths, and thus wider punch spacer inserts 21, the punch spacer insert 21 includes guide punch spacer blocks 108 and 110 for further support as shown in FIG. 8. The spacer blocks 108 and 110 engage pins 114 which are fixedly attached to punch guiding blocks 74 of both first carriage assembly 34 and second carriage assembly 36. Engagement of guide punch spacer blocks 108 and 110 with pins 114 prevent possible movement at the end of the wide punch spacer insert 21.

Figure 9:
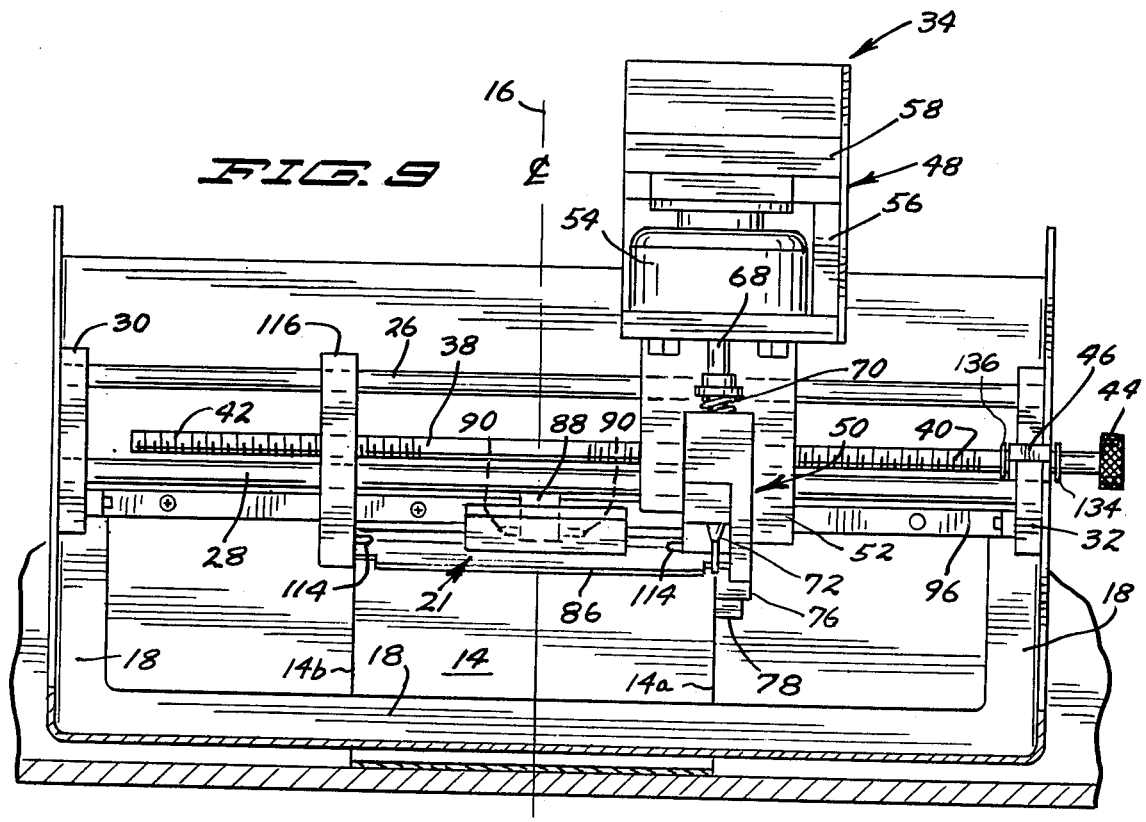
FIG. 9 is a front view of the apparatus with a spacer insert between a carriage assembly and a dummy carriage.

In some photofinishing operations, only cut marks are needed, and end-of-order marks are unnecessary. FIG. 9 shows an embodiment of the present invention in which only cut marks are produced along edge 14a of print paper 14. In FIG. 9 a dummy carriage assembly 116 replaces second carriage assembly 36. Dummy carriage assembly 116 slidably engages top guide rod 26 and bottom guide rod 28, and is propelled by carriage position lead screw 38 and engages spacer insert 21 in the same manner as second carriage assembly 36 (which it has replaced), but does not have the indicia producing assembly 50 or the solenoid assembly 48. The purpose of the dummy carriage assembly 116 is to provide the capability of producing indicia on only one side of print paper 14 and still provide an engaging surface for punch spacer insert 21. The dummy carriage 116 also has a pin 114 to engage a guide punch spacer block of a wide punch spacer insert. Similarly in operations in which cut marks only are desired along edge 14b, a dummy carriage assembly which is the mirror image of dummy carriage 116 replaces first carriage assembly 34.

As shown in the Figures, the punch marking apparatus preferably forms a module which is attached to paper mask 18 by a quick connect/disconnect mounting assembly. When a different print length is desired, thereby necessitating a different paper mask, the entire punch marking module is quickly disconnected from the paper mask, the previous paper mask is removed and a new paper mask is inserted, and the punch marking module is connected to the new paper mask. The quick connect/disconnect mounting assembly automatically centers the punch marking module properly with respect to the paper mask.

The quick connect/disconnect mounting assembly, which is the subject of the previously mentioned co-pending application entitled "Modular Punch Marking Apparatus", is best illustrated in FIGS. 4, 10 and 11. FIG. 4 is a sectional view of the entire assembly; FIG. 10 is a bottom view of the entire punch marking module; and FIG. 11 is a top view of paper mask 18 showing the portion of paper mask 18 which receives and holds the punch marking module. In FIG. 11, the position of rigid member 96 of the punch marking module is illustrated in phantom.

As shown in the Figures, the connection of the punch marking module and paper mask 18 is made by means of rigid member 96, which extends between end holders 30 and 32 and forms the bottom of the punch marking assembly. Connected to the top surface of mask 18 is mounting base 118. A pair of detent bars 124 are attached to the top surface of mounting base 118 proximate edge 118a, which is closest to the open area of mask 18. Positioned proximate opposite edge 118b of mounting base 118 are two upstanding guide or registration pins 126.

Rigid member 96 has four ball plungers 128 positioned along edge 96a. In addition, member 96 has a ball plunger 130 at each end 96b and 96c. When the punch marking module is connected to mask 18, edge 96d of member 96 is inserted under the heads of registration pins 126 and member 96 is pivoted downward until ball plungers 138 and 130 engage detent bars 124. Ball plungers 128 engage surfaces 124a of detent bars 124 and apply force to member 96 to hold edge 96d securely against registration pins 126. Ball plungers 130 engage recesses or grooves 132 at the ends of detent bars 124 and side edges 134,136 of the mounting base engage end plate holders 30, 32. The ball plungers 130 and grooves 132 form a snap lock means for releasably holding member 96, and therefore the punch marking module, in engagement with mounting base 118. The end plate holders 30, 32 engaging the mounting base sides 134, 136 hold the punch marking module securely in the transverse direction.

When removal of the punch marking module is desired, the assembly is pivoted to pop ball plungers 130 out of grooves 132 and to move ball plungers 128 out of engagement with surfaces 124a of detent bars 124. Member 96 is then moved out of engagement with registration pins 126 and the entire module is lifted away from paper mask 18.

In use, the apparatus of the present invention provides an easy method for adjusting to different print paper widths. When a change in width is desired, the carriage positioning lead screw 38 first moves the first and second carriage assemblies 34 and 36 apart, and the spacer insert 21 between the first and second carriage assemblies is removed. A different spacer insert 21 corresponding to the new desired print paper width is inserted by means of punch spacer key 88 and punch spacer shaft 90 and corresponding recesses 92 and 94 in punch spacer insert 21 as shown in FIG. 5. The carriage positioning lead screw 38 moves the first and second carriage assemblies 34 and 36 back together symmetrically along the guide path defined by top and bottom guide rods 26 and 28 until the space defined by the new spacer insert 21 is attained. The small amount of transverse movement of lead screw 38 permitted by retaining rings 134 and 136 allows both carriage assemblies to engage the spacer insert 21 even though one carriage assembly may engage the spacer insert slightly sooner than the other. Additionally, when a wide spacer insert 21 is being used the first and second carriage assemblies 34 and 36 will engage the guide punch spacer blocks 108 and 110 with pins 114.

In this manner the spacing of the first and second carriage assemblies with respect to one another and with respect to the center line of the print paper is quickly and easily determined. The location of the first and second indicia producing assemblies 50 with respect to edges 14a and 14b of the print paper 14 is also positively determined with no further adjustment necessary. This is especially helpful when setting up in the dark.

Although the embodiment of the present invention shown in the Figures provides manual adjustment of the position of carriage assemblies 34 and 36, the present invention may also be used to advantage in providing automatic adjustments. In one embodiment of an automatic system, lead screw 38 is driven by a stepper motor which is controlled by the printer control system. In this embodiment, spacer inserts are not required since the control system controls position and spacing of carriage assemblies 34 and 36 by the number and direction of steps of the stepper motor.

Although the present invention has been described with reference to preferred embodiment, persons skilled in the art will recognize that changes may be made in form and detail without departing from the spirit and scope of the invention. For example, the preferred embodiments shown in the Figures use a punch type of indicia producing apparatus. It can be seen, however, that the present invention is equally applicable to other types of indicia producing devices such as light sources for photographically producing cut and end-of-order marks which are supported by the carriage assemblies.

What is claimed is:

1. In a photographic printer in which a photographic print paper strip is transported along a paper path and is exposed to light from a photographic film original at a print mask location, and in which print mask means located at the print mask location defines first and second transverse masking edges of an exposure area, adjustable indicia producing apparatus for providing indicia at selected locations of the print paper and being adjustable to accommodate print paper strips of different widths, the adjustable indicia producing apparatus comprising:

guide means positioned proximate the print mask location and defining a guide path transverse to the paper path and parallel to the first transverse masking edge;

first and second carriage means movable along the guide path on opposite sides, respectively, of a center line of the paper path slidably supported by the guide means;

carriage positioning means for moving the first and second carriage means along the guide path essentially symmetrically and simultaneously about the center line of the paper path; and first indicia producing means carried by the first carriage means for providing indicia at selected longitudinal positions as the print paper is advanced along the paper path, the first indicia producing means having a position transverse to the paper path which is adjustable by movement of the first carriage means to accommodate print paper strips of different widths.

2. The invention of claim 1 wherein the guide means comprise a plurality of guide rods positioned transverse to the paper path for defining the guide path upon which the first and second carriage means are slidably supported.

3. The invention of claim 2 wherein the guide rods include a top guide rod and a bottom guide rod.

4. The invention of claim 1 wherein the carriage positioning means comprises lead screw means positioned essentially parallel to the guide means and having first and second oppositely threaded portions for moving the first and second carriage means along the guide path essentially symmetrically about the center line of the paper path.

5. The invention of claim 4 wherein the lead screw means includes an adjustment screw knob attached to one end thereof.

6. The invention of claim 1 and further comprising: second indicia producing means carried by the second carriage means for providing indicia at selected longitudinal positions as the print paper is advanced along the paper path, the second indicia producing means having a position transverse to the paper path which is adjustable by movement of the second carriage means to accommodate print paper strips of different widths.

7. The invention of claim 6 wherein the first indicia producing means provides cut indicia indicative of a desired cut location of each print, and wherein the second indicia producing means provides end-of-order indicia indicative of an end of each customer order.

8. The invention of claim 7 wherein the first and second indicia producing means are first and second paper punches.

9. The invention of claim 8 wherein the first and second paper punches are controlled by first and second solenoid means mounted on and movable with the first and second carriage means, respectively.

* * * * *